2,846,447
Patented Aug. 5, 1958

2,846,447

SIDE CHAIN REMOVAL PROCESS

William E. Weesner, Dayton, Ohio, assignor to Monsanto Chemical Company, St. Louis, Mo., a corporation of Delaware No Drawing. Application September 3, 1954
Serial No. 454,225

10 Claims. (Cl. 260—340.5)

This invention relates to a process for removal of the β-carboxyethyl side chain of certain polyhydrophenanthrene compounds referred to hereinafter as keto-acids.

1,8a - dimethyl-$\Delta^{10a(1)}$-polyhydrophenanthren-2-ones of the structure

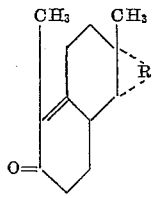

where R is a substituted or unsubstituted 4-carbon atom chain forming a 6-membered fused ring as described, are employed in the total synthesis of steroidal compounds of the cyclopentanopolyhydrophenanthrene series. In the intermediary steps which provide for Ring A a β-carboxyethyl group is introduced to the 1-position of said 1,8a-dimethyl - $\Delta^{10a(1)}$ - polyhydrophenanthren - 2 - ones. By so doing a new asymmetric center is introduced which yields therefore a one hundred percent increase in the number of geometric isomers. These isomers are generically termed keto-acids, half of which are termed α-keto-acids and the other, their epimers, β-keto-acids. As those skilled in the art are well aware but only one of these keto-acid isomers is useful in synthesizing a particular steroid and, thusly, means have been constantly sought to convert the other to a useful product in the synthesis.

In accordance with this invention it has been found that the alkali metal salt of a keto-acid of the structure

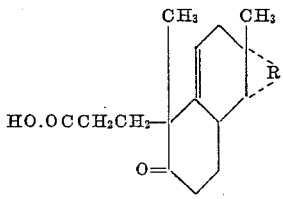

where R is a substituted or unsubstituted 4-carbon atom chain forming a 6-membered fused ring as described, in the form of a melt upon subjection to a pyrolyzing temperature at a pressure below atmospheric is readily converted to the corresponding 1,8a-dimethyl-$\Delta^{10a(1)}$-polyhydrophenanthren-2-one.

In the process of this invention the pyrolyzing temperature generally will be in the range of from about 200° C. to about 350° C., but preferably in the range of from about 250° C. to about 320° C. Although any pressure below atmospheric is operable, it is preferred that pressures below about 100 mm. of mercury be employed.

The keto-acid salt starting materials are prepared by methods fully described in the literature as is the preparation of the parent keto-acid compounds, e. g. J. A. C. S., 74, pp. 4223 ff., and J. A. C. S., 75, p. 4110. As illustrative of the keto-acid salt starting materials of this invention are the sodium, potassium and lithium salts of:

1,8a - dimethyl - 1 - (β-carboxyethyl) - $\Delta^{5,7,10}$ - octahydrophenanthren-2-one;
1,8a - dimethyl - 1 - (β-carboxyethyl - $\Delta^{6,10}$ - decahydrophenanthren-2-one;
1,8a - dimethyl - 1 - (β-carboxyethyl) - $\Delta^{10}$ - dodecahydrophenanthren-2-one;
1,8a - dimethyl - 1 - (β-carboxyethyl) - $\Delta^{10}$ - dodecahydrophenanthren-2,8-dione;
1,8a - dimethyl - 1 - (β-carboxyethyl) - 8 - bromo - $\Delta^{10}$-dodecahydrophenanthren-2-one;
1,8a - dimethyl - 1 - (β-carboxyethyl) - 8 - chloro - $\Delta^{10}$-dodecahydrophenanthren-2-one;
1,8a - dimethyl - 1 - (β-carboxyethyl) - 6,7 - dihydroxy-$\Delta^{10}$-dodecahydrophenanthren-2-one acetonide; and like 1,8a - dimethyl - 1 - (β-carboxyethyl) - $\Delta^{10}$ - polyhydrophenanthren-2-ones.

As illustrative of the process of this invention is the following:

Example 1

To a suitable reaction vessel equipped with a take-off tube connected through a vacuum adapter to a receiving vessel is added approximately 10 parts by weight the sodium salt of the α-isomer of dl-anti-trans-1,8a-dimethyl-1 - (β-carboxyethyl) - 6,7 - dihydroxy - $\Delta^{10}$ - dodecahydrophenanthren-2-one acetonide. [This salt is prepared by admixing the theoretical quantity of 0.1 N sodium hydroxide with the α-isomer of dl-anti-trans-1,8a-dimethyl - 1 - (β-carboxyethyl) - 6,7 - dihydroxy - $\Delta^{10}$ - dodecahydrophenanthren-2-one acetonide until complete solution occurs, followed by evaporating to dryness and grinding the dry product.] The contents of the reaction vessel are melted and heated in an oil bath over a range of about 250–313° C. at 0.3–0.4 mm. of mercury pressure. After a period of 50 minutes approximately 4.6 parts by weight of distillate is collected which distillate is taken up with a mixture of diethyl ether and petroleum ether and crystallized therefrom. The white crystalline substance so obtained is dl-anti-trans-1,8a-dimethyl-6,7-dihydroxy-$\Delta^{10a(1)}$-dodecahydrophenanthren-2-one acetonide. The yield based upon the distillate is 56.9% of theory.

Similarly also colorless oily dl-anti-trans-1,8a-dimethyl-$\Delta^{6,10a(1)}$-decahydrophenanthren-2-one is obtained by the pyrolysis of the potassium salt of the α-isomer of dl-anti-trans-1,8-dimethyl - 1 - (β - carboxyethyl) - $\Delta^{6,10}$-decahydrophenanthren-2-one.

In the process of this invention either crude or pure keto-acid in the form of its alkali metal salt may be employed. A particular aspect of this invention is admixing a keto-acid salt with an alkali metal salt of a hydrocarbon mono-carboxylic acid, i. e. a compound of the formula R—CO.OH where R is a hydrocarbon radical such as methyl, ethyl, propyl, butyl, hexyl, octyl, decyl, benzyl, phenethyl, phenpropyl, phenyl, tolyl, ethylphenyl, indenyl, naphthyl, etc., and subjecting a melt of the mixture to a pyrolyzing temperature employing a pressure below atmospheric. As illustrative of this embodiment is the following:

Example II

To a suitable reaction vessel equipped with a take-off tube connected through a vacuum adapter to a receiving vessel is added approximately 4.9 parts by weight of the sodium salt of the α-isomer of dl-anti-trans-1,8a-dimethyl-1-(β-carboxyethyl) - 6,7 - dihydroxy-$\Delta^{10}$-dodecahydrophenanthren-2-one acetonide and approximately 50 parts by weight of sodium phenyl acetate and intimately mixed. This mixture (melting point about 200° C.) is heated in an old bath over a range of about 280–300° C. under a pressure of about 0.15 to 0.3 mm. of mercury. After a period of about two hours approximately 3.8 parts by weight of distillate is collected which distillate is taken up with a mixture of diethyl ether and petroleum ether and crystallized therefrom. The white crystalline product so obtained is *dl*-anti-trans-1,8a-methyl-6,7-dihydroxy-Δ$^{10a(1)}$-dodecahydrophenanthren-2-one acetonide. The yield based upon the distillate is 64.6% of theory.

*Example III*

To a suitable reaction vessel equipped with a take-off tube connected through a vacuum adapter to a receiving vessel is added approximately 50 parts by weight of potassium acetate and approximately 50 parts by weight of sodium acetate and the mixture melted. To the melt is added approximately 10 parts by weight of the sodium salt of the α-isomer of *dl*-anti-trans-1,8a-dimethyl-1-(β-carboxyethyl)-Δ$^{6,10}$-decahydrophenanthren-2-one. The mix is then heated over a range of about 260–310° C. under a pressure of about 2 mm. of mercury. After a period of about 45 minutes the collected distillate is taken up with chloroform, washed with water, dried and then evaporated. Approximately 4 parts by weight of a yellow oil consisting chiefly of colorless oily *dl*-anti-trans-1,8a-dimethyl-Δ$^{6,10a(1)}$-decahydrophenanthren-2-one is obtained.

*Example IV*

To a suitable reaction vessel equipped with a take-off tube connected through a vacuum adapted to a recovery vessel is added approximately 7.5 parts by weight of the sodium salt of the β-isomer of *dl*-anti-trans-1,8a-dimethyl-1-(β-carboxyethyl)-6,7-dihydroxy-Δ$^{10}$-dodecahydrophenanthren-2-one acetonide, approximately 38 parts by weight of sodium acetate and approximately 38 parts by weight of potassium acetate. The mixture is melted and heated over a range of about 252–282° C. at a pressure of about 0.1 mm. of mercury. After a period of about 50 minutes approximately 4.5 parts by weight of distillate is collected, which distillate is then taken up with diethyl ether. Upon cooling the solution and seeding, approximately 2.9 parts by weight of white crystalline *dl*-anti-trans-1,8a-dimethyl-6,7-dihydroxy-Δ$^{10a(1)}$-dodecahydrophenanthren-2-one acetonide is obtained.

*Example V*

To a suitable reaction vessel equipped with a take-off tube connected through a vacuum adapter to a recovery vessel is added approximately 10 parts by weight of the sodium salt of the α-isomer of *dl*-anti-trans-1,8a-dimethyl-1-(β-carboxyethyl)-6,7-dihydroxy-Δ$^{10}$-dodecahydrophenanthren-2-one acetonide and approximately 60 parts by weight of sodium benzoate. The mixture is melted and heated over a range of about 260–278° C. at a pressure of about 0.03–0.07 mm. of mercury. After a period of about 82 minutes approximately 4.1 parts by weight of distillate is collected, which distillate is taken up with a mixture of diethyl ether and petroleum ether and crystallized therefrom. The white crystalline product so obtained is *dl*-anti-trans-1,8a-dimethyl-6,7-dihydroxy-Δ$^{10a(1)}$-dodecahydrophenanthren-2-one acetonide. The yield based upon the distillates is 53.7% of theory.

*Example VI*

To a suitable reaction vessel equipped with a take-off tube connected through a vacuum adapter to a recovery vessel is added approximately 10.1 parts by weight of the sodium salt of the α-isomer of *dl*-anti-trans-1,8a-dimethyl-1-(β-carboxyethyl)-6,7-dihydroxy-Δ$^{10}$-dodecahydrophenanthren-2-one acetonide and approximately 100 parts by weight of sodium phenyl acetate. The mixture is melted and heated over a range of about 248–285° C. at a pressure of about 0.1–0.2 mm. of mercury. After a period of about 115 minutes approximately 9.7 parts by weight of distillate is collected, which distillate is taken up with a mixture of diethyl ether and petroleum ether and crystallized therefrom. The white crystalline product is *dl*-anti-trans-1,8a-dimethyl-6,7-dihydroxy-Δ$^{10a(1)}$-dodecahydrophenanthren-2-one acetonide. The yield based upon the distillate is 97% of theory.

The amount of alkali metal salt of a hydrocarbon monocarboxylic acid admixed with the keto-acid salt may vary widely, as for example from 0.5 to 20 parts by weight for each part by weight of the keto acid salt may be employed. In general, however, 1 to 10 parts by weight for each part by weight of the keto-acid salt gives optimum results.

Although the invention has been described with respect to certain embodiments it is to be understood that it is not so limited and that variations and modifications thereof obvious to those skilled in the art may be made without departing from the spirit or scope of this invention.

What is claimed is:

1. In a process for the removal of the β-carboxyethyl side chain of a polyhydrophenanthrene compound, the step which comprises subjecting an alkali metal salt of an 1,8a-dimethyl-1-(β-carboxyethyl)-Δ$^{10}$-polyhydrophenanthren-2-one of the structure

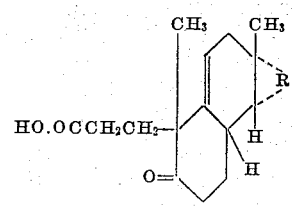

where R is a 4-carbon atom chain linking the 5a and 8a carbon atoms to form a 6-membered fused ring, in the form of a melt to a temperature in the range of about 200° C. to about 350° C. at a pressure below atmospheric.

2. The process of claim 1 wherein the pressure is below about 100 mm. of mercury.

3. In a process for the removal of the β-carboxyethyl side chain of a polyhydrophenanthrene compound, the step which comprises subjecting a molten mixture of an alkali metal salt of an 1,8a-dimethyl-1-(β-carboxyethyl)-Δ$^{10}$-polyhydrophenanthren-2-one of the structure

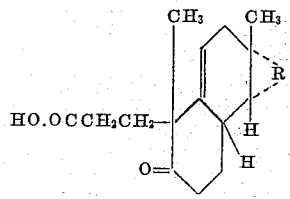

where R is a 4-carbon atom chain linking the 5a and 8a carbon atoms to form a 6-membered fused ring, said 4-carbon atom chain being selected from the group consisting of $$-CH_2-CH=CH-CH_2-$$

and

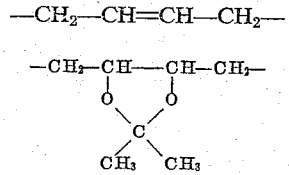

and an alkali metal salt of a hydrocarbon monocarboxylic acid whose hydrocarbon radical contains from 1 to 10 carbon atoms and is free of olefinic and acetylenic unsaturation to a temperature in the range of about 200° C. to about 350° C. at a pressure below atmospheric and recovering 1,8a-dimethyl-Δ$^{10a(1)}$-polyhydrophenanthren-2-one of the structure

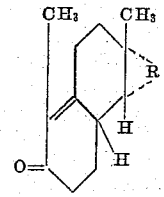

where R has the same significance as above.

4. The process of claim 3 wherein the pressure is below about 100 mm. of mercury.

5. The process of claim 3 wherein the respective alkali metal salts are sodium salts.

6. The process of removing the β-carboxyethyl side chain from anti-trans-1,8a-dimethyl-1-(β-carboxyethyl)-$\Delta^{6,10}$-decahydrophenanthren-2-one of the structure

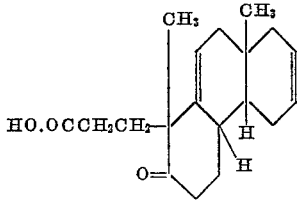

which comprises subjecting a melt of a mixture of the sodium salt of said acid and the sodium salt of a hydrocarbon mono-carboxylic acid whose hydrocarbon radical contains from 1 to 10 carbon atoms and is free of olefinic and acetylenic unsaturation to a temperature in the range of about 250° C. to about 320° C. at a pressure below about 100 mm. of mercury, collecting the distillate, and recovering from said distillate anti-trans-1,8a-dimethyl-$\Delta^{6,10a(1)}$-decahydrophenanthren-2-one of the structure

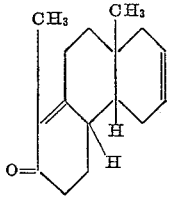

7. The process of claim 6 wherein the sodium salt of a hydrocarbon mono-carboxylic acid is sodium acetate.

8. The process of removing the β-carboxyethyl side chain from anti-trans-1,8a-dimethyl-1-(β-carboxyethyl)-6,7-dihydroxy-$\Delta^{10}$-dodecahydrophenanthren-2-one acetonide of the structure

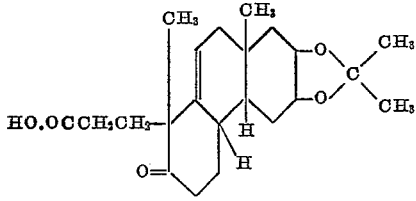

which comprises subjecting a melt of a mixture of the sodium salt of said acid and the sodium salt of a hydrocarbon mono-carboxylic acid whose hydrocarbon radical contains from 1 to 10 carbon atoms and is free of olefinic and acetylenic unsaturation to a temperature in the range of about 250° C. to about 320° C. at a pressure below 100 mm. of mercury, collecting the distillate, and recovering from said distillate anti-trans-1,8a-dimethyl-6,7-dihydroxy-$\Delta^{10a(1)}$-dodecahydrophenanthren-2-one acetonide of the structure

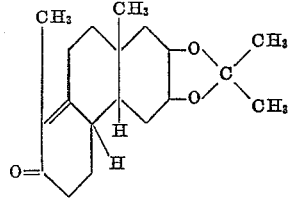

9. The process of claim 8 wherein the sodium salt of a hydrocarbon mono-carboxylic acid is sodium benzoate.

10. The process of removing the β-carboxyethyl side chain from anti-trans-1,8a-dimethyl-1-(β-carboxyethyl)-6,7-dihydroxy-$\Delta^{10}$-dodecahydrophenanthren-2-one acetonide of the structure

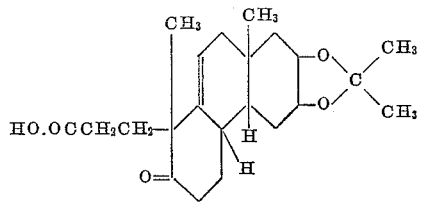

which comprises subjecting a melt of a mixture of the sodium salt of said acid and sodium phenylacetate to a temperature in the range of about 250° C. to about 320° C. at a pressure below 100 mm. of mercury, collecting the distillate, and recovering from said distillate anti-trans-1,8a-dimethyl-6,7-dihydroxy-$\Delta^{10a(1)}$-dodecahydrophenanthren-2-one acetonide of the structure

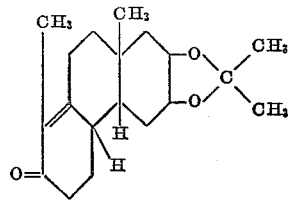

References Cited in the file of this patent

UNITED STATES PATENTS 2,749,367    Barkley _____ June 5, 1956

OTHER REFERENCES

Woodward, JACS, pp. 4224 ff. (1952).